(12) United States Patent
Minervino et al.

(10) Patent No.: US 11,939,937 B2
(45) Date of Patent: Mar. 26, 2024

(54) METHOD FOR MANUFACTURING A COMPOSITE PLATFORM FOR A FAN OF AN AIRCRAFT TURBINE ENGINE

(71) Applicant: Safran Aircraft Engines, Paris (FR)

(72) Inventors: Matteo Minervino, Moissy-Cramayel (FR); Didier Fromonteil, Moissy-Cramayel (FR); Hervé Grelin, Moissy-Cramayel (FR); Damien Bruno Lamouche, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/908,500

(22) PCT Filed: Mar. 1, 2021

(86) PCT No.: PCT/FR2021/050340
§ 371 (c)(1),
(2) Date: Aug. 31, 2022

(87) PCT Pub. No.: WO2021/176167
PCT Pub. Date: Sep. 10, 2021

(65) Prior Publication Data
US 2024/0060460 A1    Feb. 22, 2024

(30) Foreign Application Priority Data

Mar. 3, 2020  (FR) ........................... 2002122

(51) Int. Cl.
*F02K 3/06*   (2006.01)
*B29C 70/72*  (2006.01)
(Continued)

(52) U.S. Cl.
CPC ................ *F02K 3/06* (2013.01); *B29C 70/72* (2013.01); *B29K 2705/00* (2013.01);
(Continued)

(58) Field of Classification Search
CPC ......... F01D 11/00; F01D 25/00; B29C 70/72; B29C 70/30; F02K 3/06; B29K 2700/00;
(Continued)

(56) References Cited

U.S. PATENT DOCUMENTS 5,193,982 A    3/1993  Inizan et al.
6,312,224 B1 * 11/2001  Knott .................... F01D 11/008
                                                    416/248
(Continued)

FOREIGN PATENT DOCUMENTS

| EP | 1013886 | 6/2000 |
| EP | 2837774 | 2/2015 |
| EP | 3536909 | 9/2019 |

OTHER PUBLICATIONS

International Patent Application No. PCT/FR2021/050340, International Search Report dated May 18, 2021, 13 pages (10 pages of original document and 3 pages of English translation).

*Primary Examiner* — David E Sosnowski
(74) *Attorney, Agent, or Firm* — Kilpatrick Townsend & Stockton LLP (57) ABSTRACT

The invention relates to a method for manufacturing a composite platform (30) for a fan of an aircraft turbine engine, wherein said platform comprises an elongate wall (32) and is configured to extend between two fan blades (3), said wall comprising an outer aerodynamic surface (32*a*) and an inner surface (32*b*), on which a fastening tab is located (34), said fastening tab being configured to be fixed to a fan disc (2). The invention is characterized in that it comprises the steps of: a) preparing fabrics or sheets which are pre-impregnated with a resin, b) depositing the fabrics or sheets in a mold, c) positioning a metal reinforcement (36) in the mold on the fabrics or sheets, the reinforcement being integrally formed with said fastening tab, d) depositing the fabrics or sheets on a part of the reinforcement, and e)

(Continued)

closing and heating the mold for solidification of the assembly formed by the fabrics or sheets and the reinforcement.

10 Claims, 5 Drawing Sheets

(51) Int. Cl.
  *B29K 705/00* (2006.01)
  *B29L 31/08* (2006.01)
(52) U.S. Cl.
  CPC ....... *B29L 2031/08* (2013.01); *F05D 2220/36* (2013.01); *F05D 2240/80* (2013.01); *F05D 2300/603* (2013.01)
(58) Field of Classification Search
  CPC ............. B29L 2031/08; F05D 2220/36; F05D 2240/80; F05D 2300/603
  See application file for complete search history.

(56) References Cited

U.S. PATENT DOCUMENTS

| | | | | |
|---|---|---|---|---|
| 7,237,709 | B2* | 7/2007 | Beckford | B21D 26/055 |
| | | | | 228/157 |
| 8,256,118 | B2* | 9/2012 | Cammer | B23P 15/04 |
| | | | | 29/889.7 |
| 10,995,632 | B2* | 5/2021 | Malmborg | F01D 5/147 |
| 11,033,993 | B2* | 6/2021 | Malmborg | B23P 15/04 |
| 11,148,221 | B2* | 10/2021 | Bales | F01D 5/147 |
| 11,174,737 | B2* | 11/2021 | Dolan | B23K 20/129 |
| 11,236,619 | B2* | 2/2022 | Bales | F01D 5/184 |
| 11,248,477 | B2* | 2/2022 | Bales | B23P 15/04 |
| 2008/0184762 | A1* | 8/2008 | Hammar | B21D 37/16 |
| | | | | 72/342.1 |
| 2017/0022824 | A1 | 1/2017 | Turner et al. | |
| 2017/0101876 | A1 | 4/2017 | Wang et al. | |
| 2020/0368805 | A1* | 11/2020 | Bales | B21D 37/16 |

* cited by examiner

METHOD FOR MANUFACTURING A COMPOSITE PLATFORM FOR A FAN OF AN AIRCRAFT TURBINE ENGINE

TECHNICAL FIELD OF THE INVENTION

The present invention relates to a method for manufacturing a composite platform for an aircraft turbine engine fan.

TECHNICAL BACKGROUND

The technical background comprises in particular the documents EP-A3-1 013 886, US-A1-5 193 982, US-A1-2017/022824, EP-A1-2 837 774, US-A1-2017/101876 and EP-A1-3 536 909.

Figure 1:
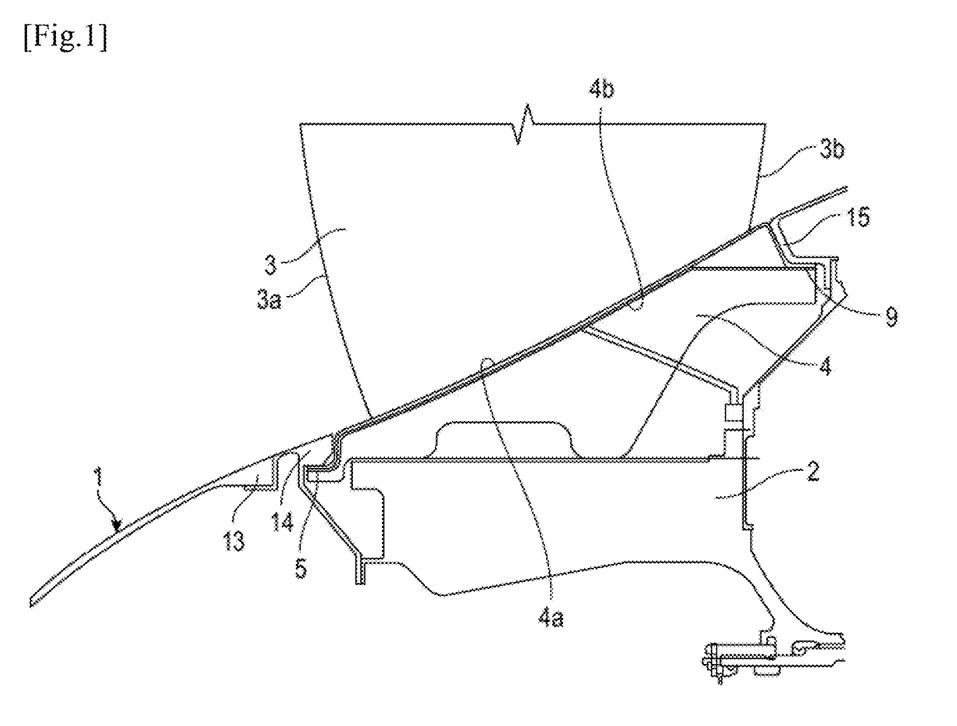
FIG. 1 is a schematic axial sectional view of a fan rotor according to the prior art.

Referring to FIG. 1, which shows a partial cross-sectional view of a fan rotor 1 of an aircraft turbine engine, it is known from the prior art that a fan rotor 1 having an axis of rotation and comprising a fan casing, a fan disc 2, fan blades 3 or vanes comprising, as a retention device, roots sleeved into alveoli in the periphery of said disc 2. Each blade 3 comprises an intrados, an extrados, a leading edge 3a and a trailing edge 3b.

The fan rotor 1 comprises platforms 4b interposed between the fan blades 3 and attached to the periphery of the disc 2. Each platform 4b comprises an aerodynamic external face 4c extending along said axis substantially from the leading edges 3a to the trailing edges 3b of the blades 3 between which this platform 4b is mounted.

Finally, the rotor 1 comprises an upstream cone 13, an upstream shroud 14 and a downstream shroud 15, the two shrouds 14, 15 being secured to the fan disc 2.

Such a fan rotor is known in particular from the document EP-A1-1 970 537.

Each platform must provide an aerodynamic function that is its primary function and a definition of the flow duct of the air.

In addition, each platform must meet all the operating conditions, i.e., ensure the performance for the entire operating envelope, e.g., a flight for an aircraft, ensure the safety requirements, and ensure the availability of the rotor as portion of the engine for a commercial use.

As far as safety is concerned, each platform must be able to absorb a significant amount of energy by crushing its lateral edges, which run along an intrados of a vane and an extrados of an adjacent vane.

It is known to realize fan vanes made of composite material, the use of composite material in the aeronautical field being particularly interesting for their mechanical properties and their gains in mass compared to a metal alloy.

The platforms are generally made of metal alloy. However, it is not conceivable to use metallic platforms with composite vanes because the risk of wear and weakening of the vanes is too high due to the metal-composite contacts.

It has therefore already been proposed to make fan platforms from composite material. However, the currently known technologies are not entirely satisfactory, in particular because the manufacturing method is long and complex and involves a significant production cost.

The present invention proposes to solve at least some of these problems in a simple, effective and economical manner.

SUMMARY OF THE INVENTION

The present invention relates to a method for manufacturing a composite platform for an aircraft turbine engine fan, this platform comprising a wall of elongated shape and configured to extend between two fan vanes, this wall comprising an aerodynamic external face and an internal face on which is located an attachment tab configured to be attached to a fan disc, characterised in that it comprises the steps of:
a) preparing fabrics or sheets pre-impregnated with a resin,
b) depositing the fabrics or sheets in a mould,
c) positioning a metallic framework in the mould, on the fabrics or sheets, the framework being formed in one part with said attachment tab,
d) depositing fabrics or sheets on a portion of the framework, and
e) closing and heating the mould in order to solidify the assembly formed by the fabrics or sheets and the framework.

The platform according to the invention is designed to reduce its mass while increasing its stiffness and its service life. It is relatively simple to manufacture, by arranging a framework with pre-impregnated (fabrics or sheets), in a heating mould. There is no particular mechanical assembly step, such as screwing, which simplifies the manufacturing and reduces the cost of manufacturing the part.

In the present application, fabric is defined as a flat, flexible element formed by weaving fibres. On the other hand, a sheet is a flat and flexible element formed by non-woven fibres.

The platform according to the invention may comprise one or more of the following characteristics, taken alone from each other, or in combination with each other:
- the framework comprises a plate which is connected to said attachment tab and which is arranged between two fabrics or sheets or two plies of fabrics or sheets;
- the plate is located away from the upstream and downstream ends of the wall;
- the wall comprises at least one lateral edge which is curved, the plate comprising at least one lateral edge which is set back with respect to that lateral edge of the wall,
- the wall comprises a lateral edge that is concavely curved and an opposite lateral edge that is convexly curved, the plate comprising two lateral edges that are set back with respect to the lateral edges of the wall;
- the framework is at least partly coated with a bonding primer and/or the external face of the wall is at least partly coated with a damping layer;
- the resin is selected from the following materials and mixtures thereof: polyaryletherketones, polyetherimides, semi-aromatic polyamides, and polyamides;
- stiffeners are projecting on the internal face of the wall and are made of resin.

The present invention also relates to a composite platform for an aircraft turbine engine fan, this platform being manufactured by a method as described above, this platform being devoid of mechanical elements for attaching the framework to the preform and to the platform, and said external face being devoid of orifices for mounting such elements.

The present invention also relates to an aircraft turbine engine, characterised in that it comprises a fan comprising a disc carrying vanes and platforms as described above.

BRIEF DESCRIPTION OF THE FIGURES

Other characteristics, purposes and advantages of the present invention will become apparent from the following detailed description and from the attached drawings, which are given as non-limiting examples and in which.

DETAILED DESCRIPTION OF THE INVENTION

Figure 2:
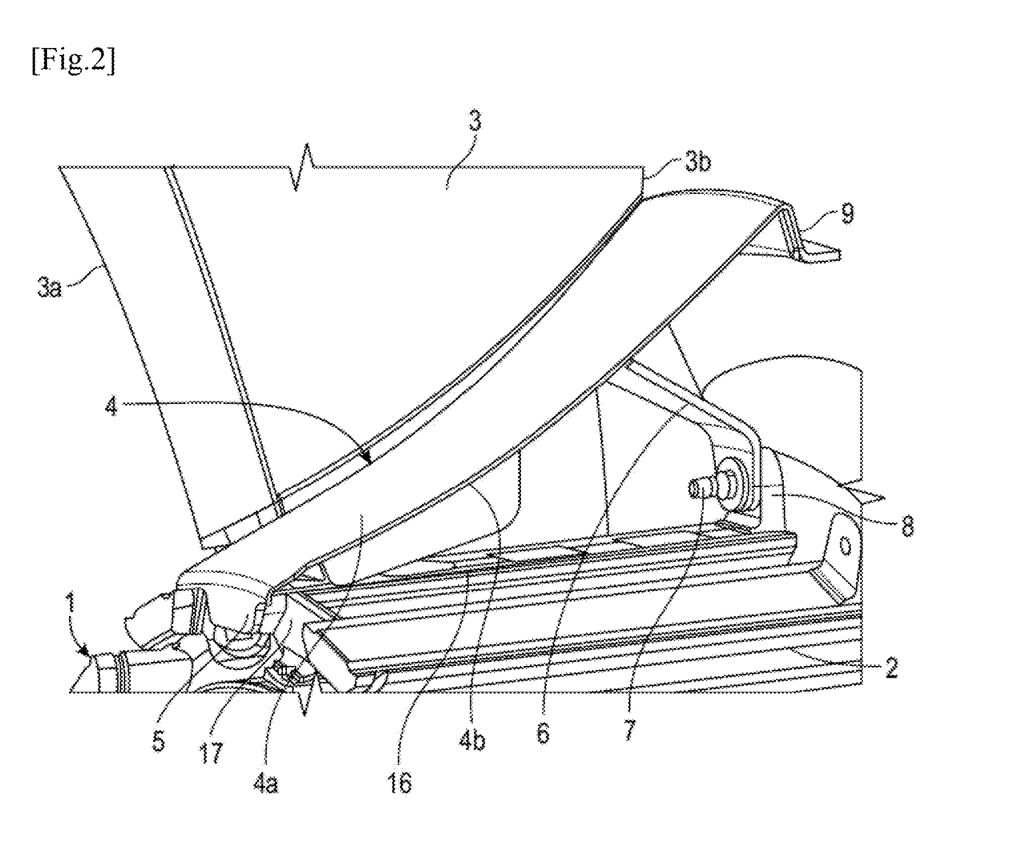
FIG. 2 is a schematic perspective view of the fan rotor in FIG. 1.

FIG. 1 has been described above and FIG. 2 shows a perspective view of a portion of the fan rotor 1 in FIG. 1. FIGS. 1 and 2 illustrate the prior art.

The rotor 1 is mounted to rotate about an axis of rotation and comprises a fan disc 2 and fan blades 3 comprising roots sleeved into alveoli in the periphery of the disc 2, only one blade 3 of which is visible in FIG. 2. Each blade 3 comprises an intrados, an extrados, a leading edge 3a and a trailing edge 3b.

A periphery of the disc 2 is advantageously toothed by being equipped with teeth 16, advantageously of trapezoidal cross-section and extending axially on the disc 2 with respect to the axis of rotation of the rotor 1. At least one wedge 17 is provided on the upstream side between two adjacent teeth 16 which form an alveole for receiving a root of a blade 3, this wedge 17 being intended to axially block the blade root in its corresponding alveole.

Platforms 4 are interposed between the fan blades 3 and attached to the periphery of the disc 2. Each platform 4 can therefore be interposed between two consecutive fan blades 3.

Each platform 4 comprises an internal face 4b (or radially internal with reference to said axis) and an aerodynamic external face 4a. These faces 4a, 4b extend along the axis substantially from the leading edges 3a to the trailing edges 3b of the two blades 3 between which this platform 4 is mounted.

At its upstream end (with reference to the flow of gases in the fan and the turbine engine), each platform 4 comprises a rim 5 for attachment or hooking to the disc 2. A similar rim 9 is located at the downstream end of each platform 4.

The internal face 4b of each platform 4 is connected to an attachment tab 6 on a flange 8 of the disc 2. This tab 6 extends radially inwards and comprises at its radially internal free end an orifice for the passage of a screw 7 for attaching the tab and the platform 4 to the flange 8 and thus to the disc 2.

The platform 4 visible in FIGS. 1 and 2 is made of a single part of metal alloy, and the present invention proposes a composite platform that can be used, for example, with fan vanes also made of composite.

Figure 3:
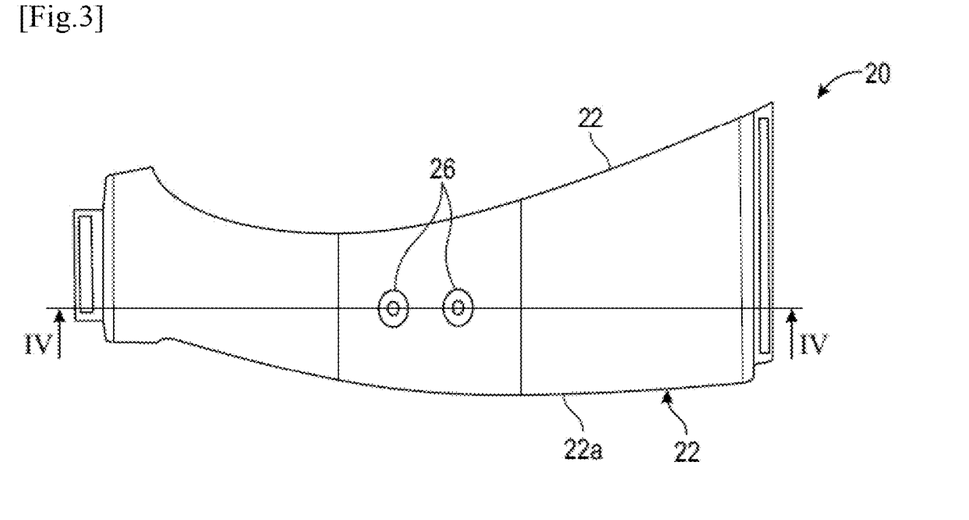
FIG. 3 is a schematic perspective view of a composite platform, seen from above or from the outside and which does not make part of the invention.
Figure 4:
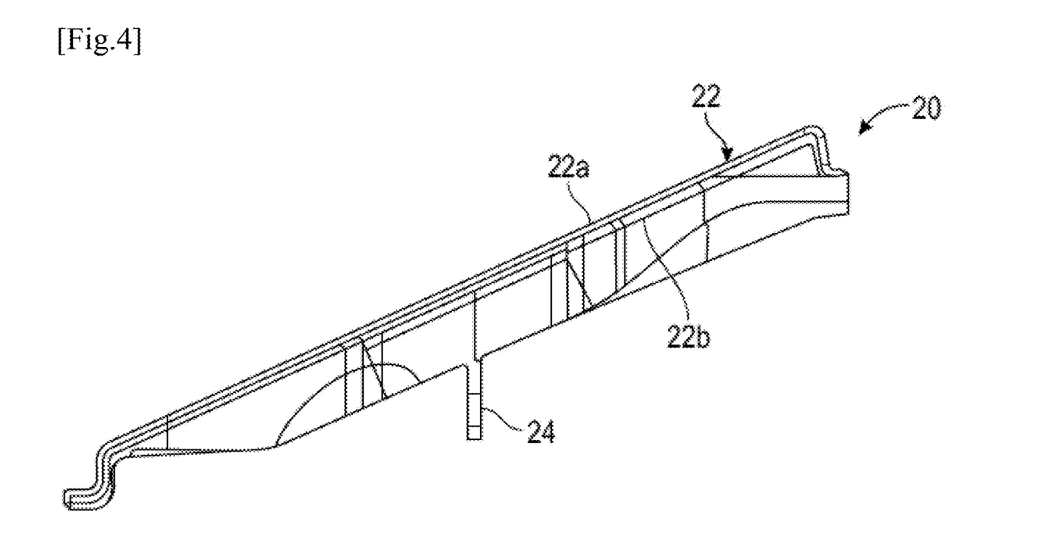
FIG. 4 is a schematic cross-sectional view along the line IV-IV of FIG. 3.
Figure 5:
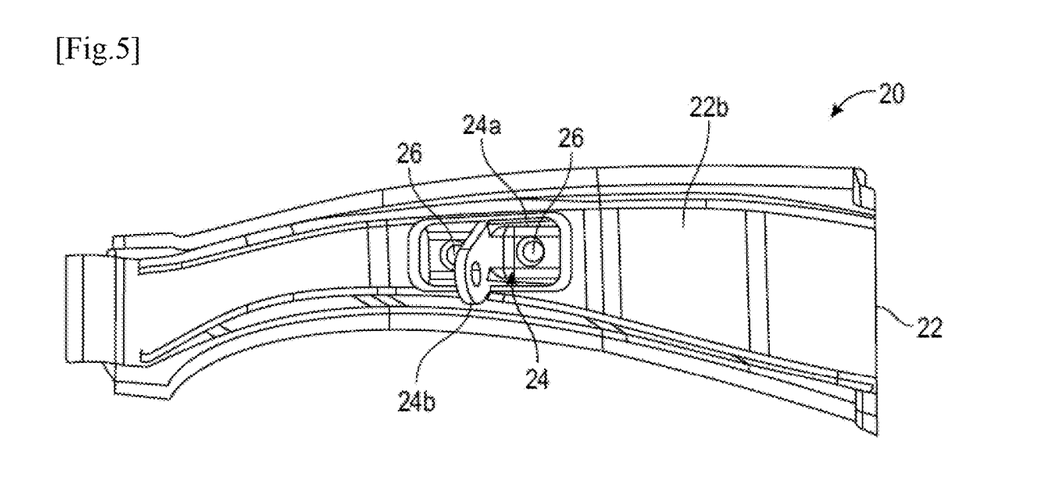
FIG. 5 is another schematic perspective view of the platform in FIG. 3, seen from below or from the inside.

FIGS. 3 to 5 describe an example embodiment of a composite platform that is not part of the invention.

The composite platform 20 of FIGS. 2 to 5 comprises an elongated wall 22 configured to extend between two fan vanes.

This wall 22 comprises an aerodynamic external face 22a and an internal face 22b on which is located an attachment tab 24 similar to the tab 6 described above.

The attachment tab 24 is made of a metal alloy and comprises a hub 24a connected to an ear 24b pierced with an orifice 24c for the passage of a screw (similar to the screw 7 described above).

The hub 24a is flat and is applied to the internal face 22b of the wall 22.

The wall 22 is made of a composite material from a resin. The wall 22 comprises, substantially in the middle, orifices that are aligned with orifices in the hub 24a and that receive screws 26 for attaching the tab 24 to the wall 22. Each screw 26 comprises a head, preferably countersunk, engaged in a recess of the external face 22a of the wall, and a threaded rod on which is screwed a nut bearing on the hub 24a.

This composite platform technology is not entirely satisfactory because it has disadvantages.

The positioning of the tab 24 on the wall 22 requires a high degree of precision (and therefore a high cost) in order to respect the geometrical constraints imposed by aerodynamics. In addition, the screw heads 26 must be covered in order to maintain the aerodynamic geometry of the duct, which also generates an additional cost by adding a covering step that is delicate and complex to control. In addition, the fact that the screw heads are covered with a coating makes it more difficult to locate them for eventual dismounting of the tab and removal of the platform for its replacement, for example.

Each platform 20 has a large mass, about 1 kilogram each, for example a fan rotor comprising eighteen platforms 20.

An allowance of the wall 22 at the level of the screws 26 and the hub 24a is necessary to reduce the caulking force in the wall, generated by its clamping; clamping which must also resist the centrifugal forces seen by the part: the clamping shape must be greater than the sum of the caulking and centrifugal forces ($F_{clamping} > F_{caulking} + F_{centrifugal}$).

The clamping force is all the more difficult to maintain because the countersunk heads of the screws 26 cannot support washers in line with their heads, which contributes to a poor distribution of clamping forces and requires a smaller volume of material.

The geometrical behaviour of each platform 20 during the engine operation as a result of centrifugal forces. The slightest deformation causes the fan to lose efficiency. Similarly, the use of screws 26 with countersunk head reduces the volume of material loaded by the assembly and significantly increases local constraints, especially at the level of the screw heads.

These last two points generate the need for a very controlled tightening of screws (torque wrench) and therefore expensive.

The durability following the covering step for the screw head. In principle, the part should last the entire life of the engine without deterioration. The erosion combined with local constraints cast doubt on the possibility of meeting this criterion.

Figure 6:
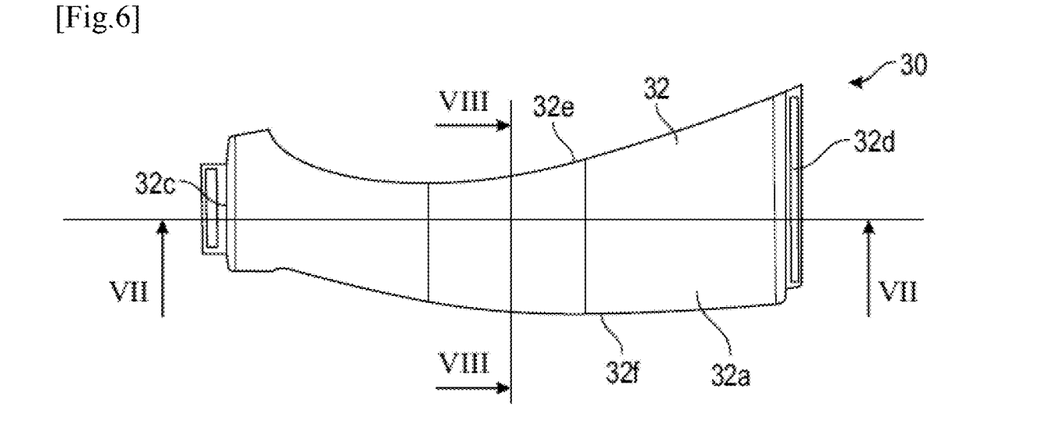
FIG. 6 is a schematic perspective view of a composite platform according to one embodiment of the invention.
Figure 7:
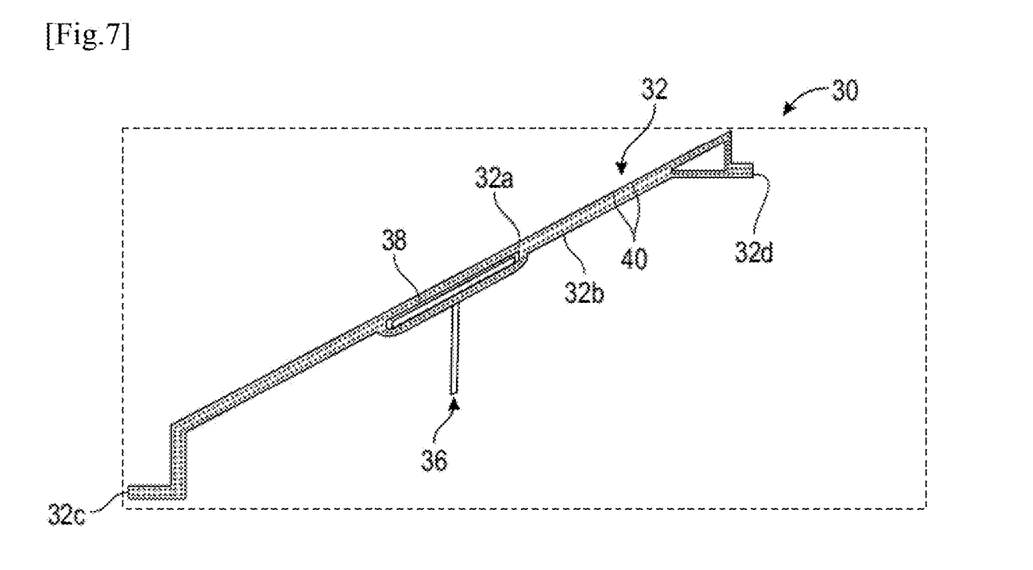
FIG. 7 is a schematic cross-sectional view along line VII-VII of FIG. 6.
Figure 8:
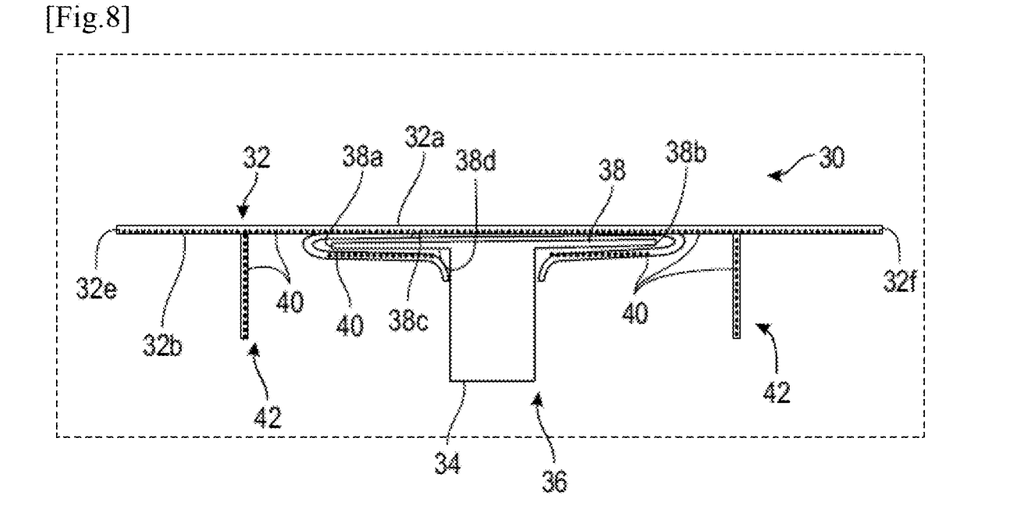
FIG. 8 is a schematic cross-sectional view along line VIII-VIII of FIG. 6.

The invention allows to remedy at least some of these problems and proposes a platform, one embodiment of which is shown in FIGS. 6 to 8.

The composite platform 30 comprises an elongated wall 32 configured to extend between two fan vanes.

This wall 32 comprises an aerodynamic external face 32a and an internal face 32b on which is located a tab 34 for attachment to a fan disc.

The wall 32 further comprises an upstream edge 32c, a downstream edge 32d, a concavely curved lateral edge 32e, and a convexly curved lateral edge 32f. It is understood that the concavely curved edge 32e extends along an extrados of a vane, from the leading edge to the trailing edge of that vane, and that the convexly curved edge 32f extends along an intrados of an adjacent vane, from the leading edge to the trailing edge of that adjacent vane. At each of the axial ends of the wall 32, at the level of edges 32c, 32d, the wall may have a rim or form a step. These ends are intended to cooperate with the shrouds of the fan rotor, as mentioned above in connection with FIG. 1.

The attachment tab 34 is formed in one part with a metallic framework 36 that is at least partly integrated into the wall 32. The framework is metallic because it has to resist a force of several tons. This wall 32 is made by superimposing pre-impregnates in a mould, the framework 36 being arranged in this mould so that no attachment screws or the like are used.

The framework 36 comprises a plate 38 that extends along the wall 32 and is connected to the attachment tab 34. From FIG. 7, it can be seen that the plate 38 is located away from the upstream 32c and downstream 32d ends of the wall 32. FIG. 8 shows that the plate 38 comprises two lateral edges 38a, 38b that are set back with respect to the lateral edges 32e, 32f of the wall 32. The edges 32e, 32f of the wall 32 are thus made from pre-impregnates and do not comprise any metallic portion of the plate, which is particularly important because these edges are likely to come into contact with a vane and be crushable by this vane in the event of the latter breaking. The "fuse" function of these edges is indeed an important criterion of these platforms for the safety criterion.

The framework 36 and in particular the plate 38 can be at least partly coated with a bonding primer or be subjected to a surface treatment, in order to improve the mechanical strength of the pre-impregnates on the framework.

The framework 36 can be made of aluminium, titanium, or steel manufactured by casting, forging, stamping and welding, machining, electro-erosion or additive manufacturing, etc.

The impregnating resin 32 is thermoplastic or thermosetting and is, for example, selected from the following materials and mixtures thereof: polyaryletherketones, polyetherimides, semi-aromatic polyamides, and polyamides.

The platform 30 is manufactured by a method comprising more specifically the steps of:
a) preparing fabrics or sheets pre-impregnated with a resin,
b) depositing fabrics or sheets in a mould,
c) positioning the framework 34 in the mould, on the fabrics or sheets, and
d) depositing fabrics or sheets on a portion of the framework, in particular the plate 38, and
e) closing and heating the mould in order to solidify the assembly formed by the fabrics or sheets and the framework. The heating can be accompanied by compression, for example under a press of the mould, or vacuum bag or bladders, etc.

As seen in FIG. 7, the wall 32 is integrally formed by the pre-impregnates 40, which therefore extend over the entire extent of the wall 32. They further extend into stiffeners 42 projecting from the internal face 32b of the wall 32.

The external face 32a of the wall 32 may be at least partly coated with a damping layer (not shown). This layer (bi-material over-moulding, painting, film bonding, etc.) can contribute to the modification of the natural frequencies of the part or to the dynamic handling of the whole fan rotor.

The invention provides several advantages:
- An estimated weight saving of 10 to 20% per part, by eliminating screws, nuts, and washers. The mass of the platform can be minimized through an optimized design of the framework (thickening in constrained locations, possibility to dig/hollow out the framework, optimization of its shape and dimensions, etc.).
- A guarantee that the aerodynamic face 32a remains smooth over time, without air flow disturbance, following the elimination of the screws and a better holding of the part following an overall stiffening of the part due to the framework and/or the reinforcements and/or the stiffeners.
- A gain in the price of the part that may not require a touch-up operation at the exit of the mould. It is no longer an assembly of several parts but a single part due to the integration of several functions (stiffeners, fusible edges, etc.).
- A simplified mounting and manufacturing. The part being with finished dimensions, it can be mounted directly. Its geometry and dimensions are ensured by the mould. The final geometry is controlled because the positioning of the metallic framework directly in the mould allows to guarantee the reproducibility of the shape.
- An improvement in the service life of the part since the clamping constraints are zero and the force passes through the metallic framework.

The invention claimed is:

1. A method for manufacturing a composite platform for an aircraft turbine engine fan, this platform comprising a wall of elongated shape and configured to extend between two fan vanes, this wall comprising an aerodynamic external face and an internal face on which is located an attachment tab configured to be attached to a fan disc,
characterised in that it comprises the steps of:
a) preparing fabrics or sheets pre-impregnated with a resin,
b) depositing the fabrics or sheets in a mould,
c) positioning a metallic framework in the mould, on the fabrics or sheets, the framework being formed in one part with said attachment tab,
d) depositing fabrics or sheets on a portion of the framework, and
e) closing and heating the mould in order to solidify the assembly formed by the fabrics or sheets and the framework.

2. The method according to claim 1, wherein the framework comprises a plate that is connected to said attachment tab and that is arranged between two fabrics or sheets, or two plies of fabrics or sheets.

3. The method of claim 2, wherein the plate is located away from the upstream and downstream ends of the wall.

4. The method according to claim 2, wherein the wall comprises at least one lateral edge that is curved, the plate comprising at least one lateral edge that is set back with respect to that lateral edge of the wall.

5. The method of claim 2, wherein the wall comprises a lateral edge that is concavely curved and an opposite lateral edge that is convexly curved, the plate comprising two lateral edges that are set back with respect to the lateral edges of the wall.

6. The method of claim 1, wherein the framework is at least partly coated with a bonding primer and/or the external face of the wall is at least partly coated with a damping layer.

7. The method of claim 1, wherein the resin is selected from the following materials and mixtures thereof: polyaryletherketones, polyetherimides, semi-aromatic polyamides, and polyamides.

8. The method of claim 1, wherein stiffeners project from the internal face of the wall and are made of resin.

9. A composite platform for an aircraft turbine engine fan, this platform being manufactured by a method according to claim 1, this platform being devoid of mechanical elements for attaching the framework to the preform and to the platform, and said external face being devoid of orifices for mounting such elements.

10. An aircraft turbine engine, characterised in that it comprises a fan comprising a disc carrying vanes and platforms according to claim 9.

* * * * *